United States Patent [19]
Lin et al.

[11] Patent Number: 5,170,269
[45] Date of Patent: Dec. 8, 1992

[54] PROGRAMMABLE OPTICAL INTERCONNECT SYSTEM

[75] Inventors: Tsen-Hwang Lin, Dallas, Tex.; Michael R. Feldman, Charlotte, N.C.

[73] Assignee: Texas Instruments Incorporated, Dallas, Tex.

[21] Appl. No.: 708,605

[22] Filed: May 31, 1991

[51] Int. Cl.$^5$ .......................... G02B 5/32; G02B 7/185; G03H 1/08
[52] U.S. Cl. .......................... 359/9; 359/20; 359/170; 359/291; 359/846
[58] Field of Search ................. 359/9, 21, 22, 25, 291, 359/292, 846, 847, 848, 849, 20, 19, 224, 154, 169, 170

[56] References Cited
U.S. PATENT DOCUMENTS

| | | | |
|---|---|---|---|
| 2,281,280 | 4/1942 | Gabor | 359/291 |
| 3,542,448 | 11/1970 | Reynolds et al. | 359/25 |
| 3,614,192 | 10/1971 | Preston, Jr. | 359/25 |
| 3,746,785 | 11/1971 | Goodrich . | |
| 3,831,035 | 8/1974 | Hill | 359/21 |
| 4,214,807 | 7/1980 | Gfeller et al. | 359/848 |
| 4,566,935 | 1/1986 | Hornbeck | 359/291 |
| 4,859,012 | 8/1989 | Cohn | 359/849 |
| 5,018,256 | 5/1991 | Hornbeck | 359/291 |
| 5,083,857 | 1/1992 | Hornbeck | 359/291 |

OTHER PUBLICATIONS

"The Making of Binary Optics", Optics & Photonics News, pp. 20-22, May 1991, Farn et al.
"Comparison Between Optical and Electrical Interconnects Based on Power and Speed Considerations", Applied Optics, vol. 27, No. 9, pp. 1742-1751, May 1988, Feldman et al.
"Computer Generated Holographic Optical Elements for Optical Interconnection of Very Large Scale Integrated Circuits", Applied Optics, vol. 26, No. 20, pp. 4377-4384, Oct. 1987, Feldman et al.
"Iterative Encoding of High-Efficiency Holograms for Generation of Spot Arrays", Optics Letters, vol. 14, No. 10, pp. 479-481, May 15, 1989, Feldman et al.
"Holograms for Optical Interconnects for Very Large Scale Integrated Circuits Fabricated by Electron-Beam Lithography", Optical Engineering, vol. 28, No. 8, pp. 915-921, May 1988, Feldman et al.
"Design of Computer Generated Holograms for a Shared Memory Network", SPIE Holographic Optics: Optically and Computer Generated, vol. 1052, pp. 204-217, 1989, Feldman et al.

Primary Examiner—Martin Lerner
Attorney, Agent, or Firm—Dana L. Burton; Richard A. Stoltz; Richard L. Donaldson

[57] ABSTRACT

This is an optical interconnect system. The system comprises: at least one signal transmitter; at least two signal receivers; at least one DMD in the same plane as the signal transmitter; and a hologram, whereby the phase of the original beam from the signal transmitter may be programmably changed, by a DMD, such that the beams received at the signal receiver may cancel or reinforce. Other methods and devices are disclosed.

20 Claims, 4 Drawing Sheets

PROGRAMMABLE OPTICAL INTERCONNECT SYSTEM

NOTICE

© Copyright, *M* Texas Instruments Incorporated 1991. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

CROSS REFERENCE TO RELATED APPLICATIONS

The following partially coassigned patent applications are hereby incorporated herein by reference:

| Serial No. | Filing Date |
| --- | --- |
| 661.855 | 02/27/91 |

FIELD OF THE INVENTION

This invention generally relates to optical interconnects and more specifically to programmable optical interconnects utilizing Deformable Mirror Devices and holograms.

BACKGROUND OF THE INVENTION

Without limiting the scope of the invention, its background is described in·connection with optical interconnects. Heretofore, in this field, it has been shown that optical interconnects are more efficient in terms of power and speed for connection lengths longer than a break-even distance Optical interconnections can be divided into two categories, guided wave and free-space optics. Guided wave interconnection uses optical fiber or integrated optics methods. Disadvantages of guided wave optical interconnects include fixed interconnects and a crowded backplane. The advantage of guided wave connection is the precision in reaching the destination. However, free-space optics can provide similar advantage if properly arranged. Furthermore, free-space optics solve routing restriction by utilizing the advantage of noninteractive property of photons when crossing over.

Many free-space optical interconnection methods have been proposed, such as computer generated hologram (CGH), and crossbar switch with spatial light modulators (SLMs). A CGH can be used in volume interconnection but in a fixed connection pattern and associated with a lower light efficiency because all optical paths should exist at all times. A crossbar switch with SLM is programmable, however, it requires $N^2$ pixels for the interconnections among N processors, it consumes more energy because of beam splitting, and it is bulky when including lenses.

SUMMARY OF THE INVENTION

This is an optical interconnect system. The system comprises: at least one signal transmitter; at least two signal receivers; at least one DMD in the same plane as the signal transmitter; and a hologram, whereby the phase of the original beam from the signal transmitter may be programmably changed, by a DMD, such that the beams received at the signal receiver may cancel or reinforce.

The system preferably comprises at least two processing elements. Each of the processing elements comprises: at least one signal transmitter; at least one signal receivers; and at least one DMD.

Preferably, the signal transmitter is a laser; the hologram is a computer generated hologram; the system connects one or more of the signal transmitters to one or more of the signal receivers; the system provides a connection network that is reconfigurable by programming the DMD; the system is a portion of a parallel computing system; the parallel computing system comprises an array of processors with integrated photosignal receivers and lasers; and the signal transmitter and the DMD may be in a different plane than the signal receivers.

This is also a method of optically connecting at least one signal transmitter to at least one signal receiver, the method comprises: receiving at the signal receiver at least two received beams, the received beams being a portion of an original beam divided at least once by a hologram and at least one of the received beams being reflected at least once by at least one DMD, with the DMD being in the same plane as the signal transmitter, whereby the phase of the original beam from the signal transmitter may be programmably changed, by a DMD, such that the beams received at the signal receiver may cancel or reinforce.

BRIEF DESCRIPTION OF THE DRAWINGS

In the drawings

Corresponding numerals and symbols in the different figures refer to corresponding parts unless otherwise indicated.

DETAILED DESCRIPTION OF PREFERRED EMBODIMENTS

A preferred embodiment of the present invention is an optical interconnect system combining a CGH and one or more deformable mirror device (DMD) SLMs. The energy efficiency can be up to 50% with this combination. It is a more sophisticated combination than the CGH or the SLM alone but it is more flexible and energy efficient.

A programmable connection network may be developed which may be used in systems such as a parallel computing system consisting of a wafer-scale integrated (or multi-chip-module) array of processors, with integrated photodetectors as signal receivers and optical sources, such as lasers, as signal transmitters. The combined hologram/DMD programmable connection system will provide the inter-processor interconnects by connecting the lasers and detectors in appropriate patterns. An 8×8 array of 32 bit processors can be accommodated on a 6" wafer. An interconnection scheme that uses a set of DMD's, and a CGH to perform the communication among multiple processing elements (PEs) is one potential use of the disclosed optical interconnect.

Figure 1A:
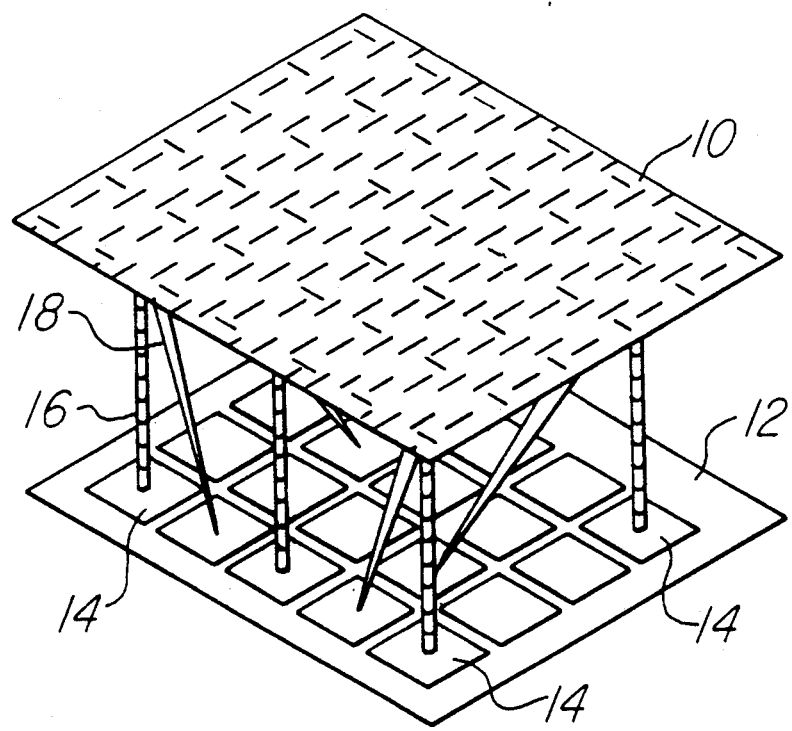
FIG. 1a-1b are top level conceptual representations, at different times, of a preferred embodiment of this invention.
Figure 1B:
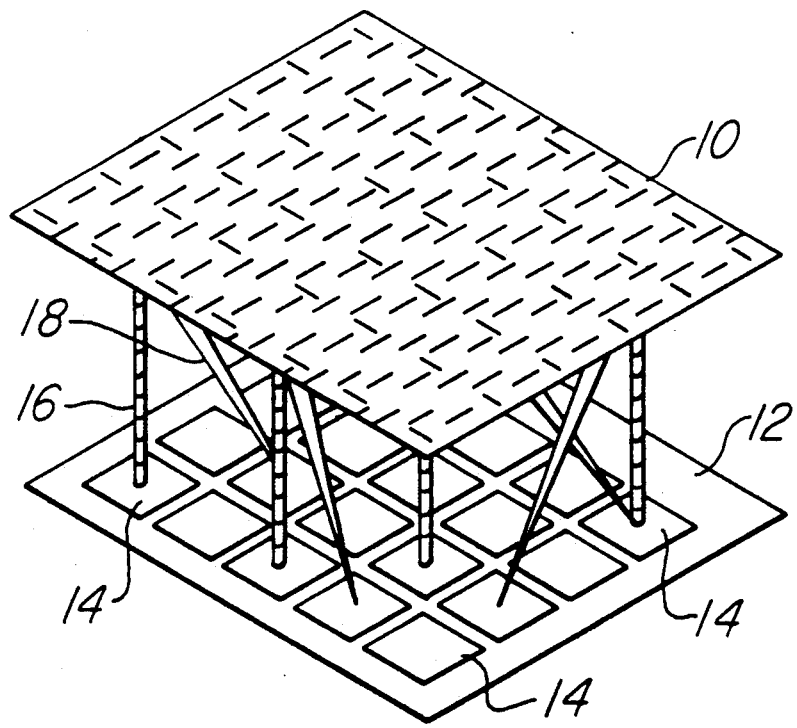

A top level view of a preferred embodiment of the optical interconnect system is shown, at times t1 and t2, in FIG. 1a and FIG. 1b, respectively. Table 3 below may be referred to for clarification of the element numbers in the drawings. The system has a CGH plane 10 and a PE plane 12 which contains multiple PEs 14. The connections between PEs is accomplished when beams 16 out of the PEs 14 are sent to the CGH 10 which sends diffracted beams 18 to the detector for the appropriate PE 14.

Figure 2:
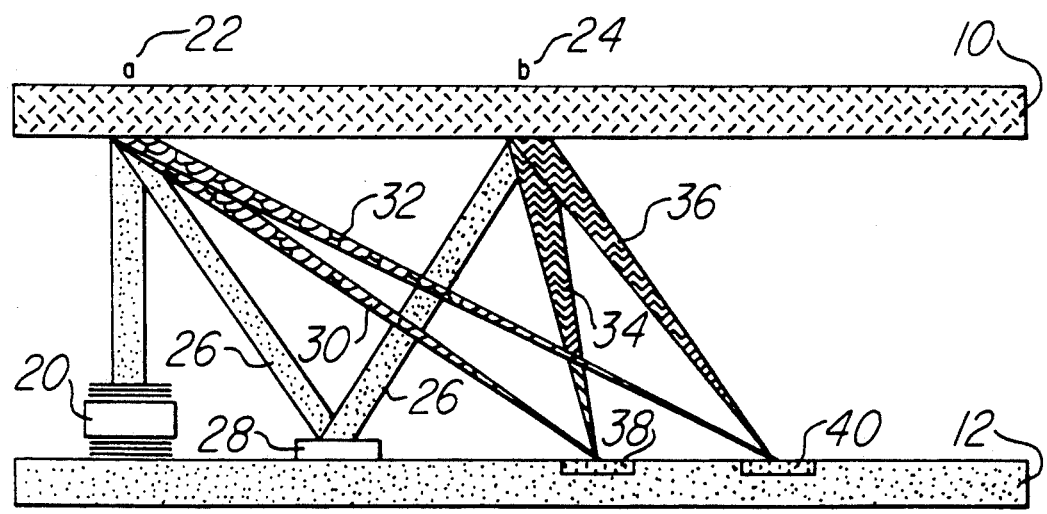
FIG. 2 is a representation of the basic interconnect scheme concept of a preferred embodiment of this invention, using 2 processing elements.
Figure 3:
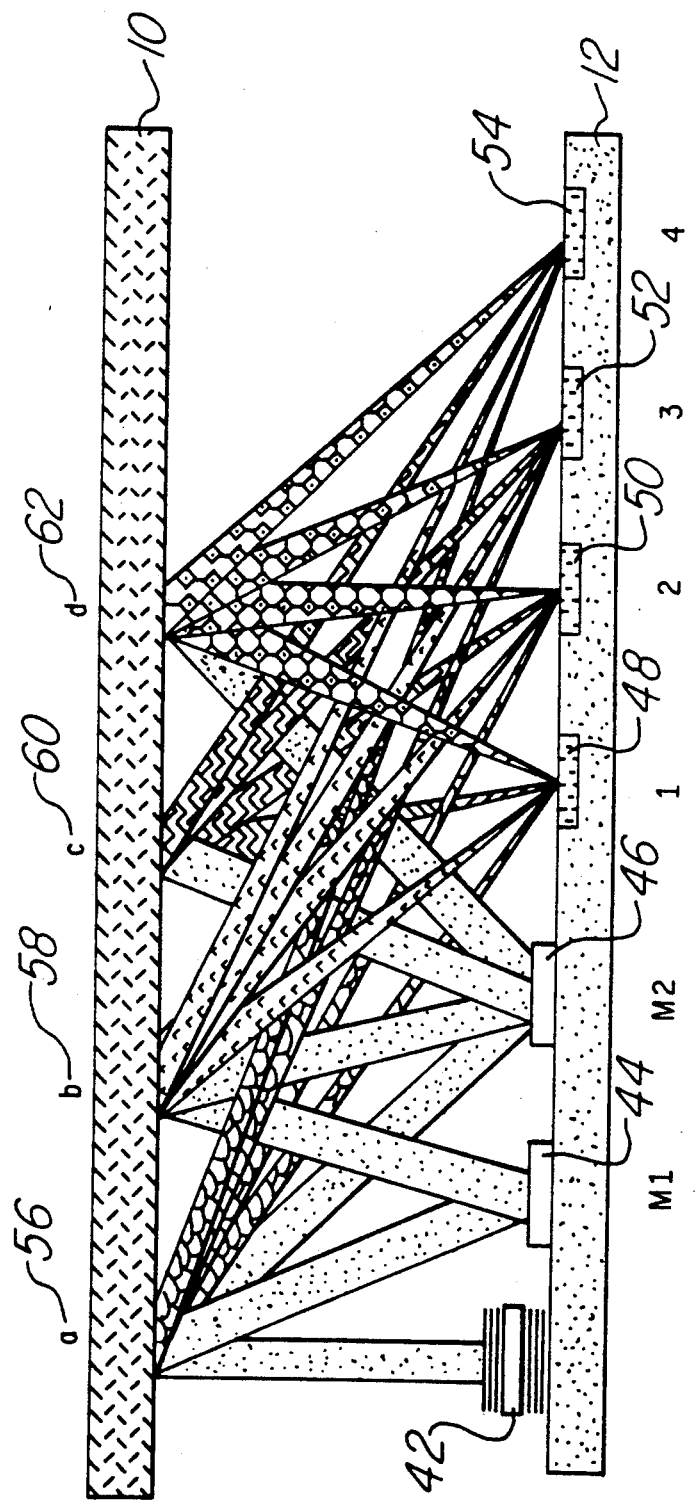
FIG. 3 is a more complex conceptual representation of an interconnect scheme using 4 processing elements.
Figure 4:
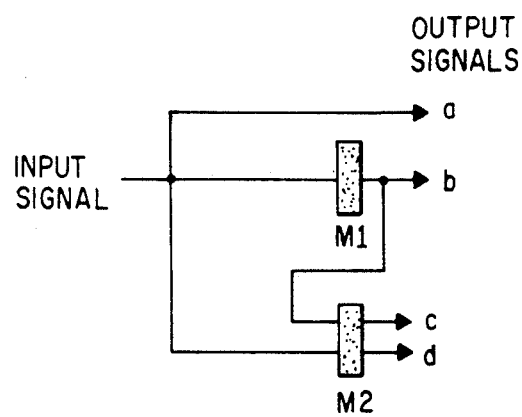
FIG. 4 is a signal flow diagram showing the paths of outputs a, b, c, and d from FIG. 3.

The basic concept used in configuring the interconnects is the interference property of light. FIG. 2 shows a basic concept interconnection scheme with, as an example, portions of two processing elements (PEs) 14. The laser (optical source) 20 in PE1 sends a beam to spot "a" 22 on CGH 10. The CGH 10 diffracts three beams back to the PE plane 12. One beam 26 is sent to the DMD 28 and reflected to spot "b" 24 in the CGH plane 10, two other beams, beams 30 and 32, are sent to detectors 38 and 40 associated with PE1 and PE2, respectively. Two beams diffracted from "b", beams 34 and 36, are sent to detectors 38 and 40, respectively. There is no phase change between beams 26 and 34, but a 180 degree phase change between beams 26 and 36. If the DMD 28 does not modulate the phase of the beam 26 reflected to "b" 24, detector 38 receives a constructive beam, and detector 40 receives a destructive beam (the beams cancel). If the DMD 28 modulates the phase of the beam 26 reflected to "b" 24 by 180 degrees, detector 38 receives a destructive beam, and detector 40 receives a constructive beam. If we expand the communication to the network of 4 PEs in the PE plane 12, we need 2 DMDs 44,46 in each PE. FIG. 3 is an example of interconnection among 4 PEs. If the phase of beam "a" 56 is $P_0$, then "b" 58 is $P_0+M_1$, "c" 60 is $P_0+M_1+M_2$ and "d" 62 is $P_0+M_2$ where $M_1$ and $M_2$ represent the phase shift of the first 44 and the second 46 modulator, respectively, and $P_0$ is the phase of the optical source 42. This is shown as a signal flow diagram in FIG. 4. Each beam is further divided by the CGH 10 into 4 beams, each of which is focused onto a different detector 48,50,52,54 in the PE plane 12. The detectors 48,50,52,54 may be in the same plane as modulators 44 and 46, as shown in FIG. 3, or they may be in a separate output plane, with the modulators 44,46 in a separate input plane, if desired. Thus a total of 16 beams emanate from each PE such that each detector 48,50,52,54 receive four beams from each PE. The resultant phase of the outputs, for this example, based on the state of modulators 44 and 46, is shown in Table 1. The phase at each detector 48,50,52,54 is controlled by CGH 10 such that when $M_1=M_2=0$, the phases of the 16 beams, for this example, emanating from a single PE, are as indicated in Table 1 ($M_1$=OFF, $M_2$=OFF). The remainder of Table 1 shows how the changes in the transmittance of the two DMD's 44 and 46 affect the interconnection pattern. Table 2 shows the connection status of each of the detectors based on the state of modulators 44 and 46. Table 2 is a result of determining whether the addition of the four output beams from points a, b, c, and d, shown in Table 1, at each detector is constructive or destructive. In Tables 1 and 2 the term OFF is used to represent no modulation at modulator 44 and/or 46. Alternately, the term ON means 180 degree phase shift at modulator 44 and/or 46. In Table 1, the number 1 is used to represent an in phase beam at the output and a $-1$ is used to represent a 180 degree phase shift (out of phase) in the beam at the output. The number of beams received at each of the detectors is generally even but may be odd, if desired, for other applications. The number of DMD's, M, needed for interconnecting N PEs is $$M = 2(\sqrt{N} - 1)$$

As an example, for 64 processors, 14 DMDs are needed in each PE.

The above method describes a scheme that can provide arbitrary 1-to-1 and many-to-one connections. The method can be modified to additionally provide one-to-many connections. The CGH 10 may be designed to change the phase of the beams going to the individual detectors, therefore allowing numerous connection schemes to be achieved. The equation above is still valid if N is replaced by the number of different connection patterns associated with each PE.

In order to realize the DMD/CGH optical interconnect the following must be accomplished:
A. Define the interconnection algorithm and number of PEs which need to be configured.
B. Define the specification of the DMDs and CGH in terms of number of DMD(s) needed in each PE, the size of the DMD, the size of each PE, and the efficiency of the CGH.
C. Fabricate wafer-scale or multi-chip module, individual-accessed array of DMD groups.
D. Compute and generate data required in CGH masks.
E. Fabricate CGH.
It should be noted that the order of fabrication is irrelevant and may be accomplished simultaneously.

The DMD used in this optical interconnect system is preferably a flexure beam DMD. The flexure beam pixel is a special version of a cantilever beam DMD. By arranging four cantilever hinges at right angles to one another, the beam is forced to move with a piston-like motion. The flexure beam DMD yields phase-dominant modulation which is ideal for the preferred embodiment of this invention.

Figure 5:
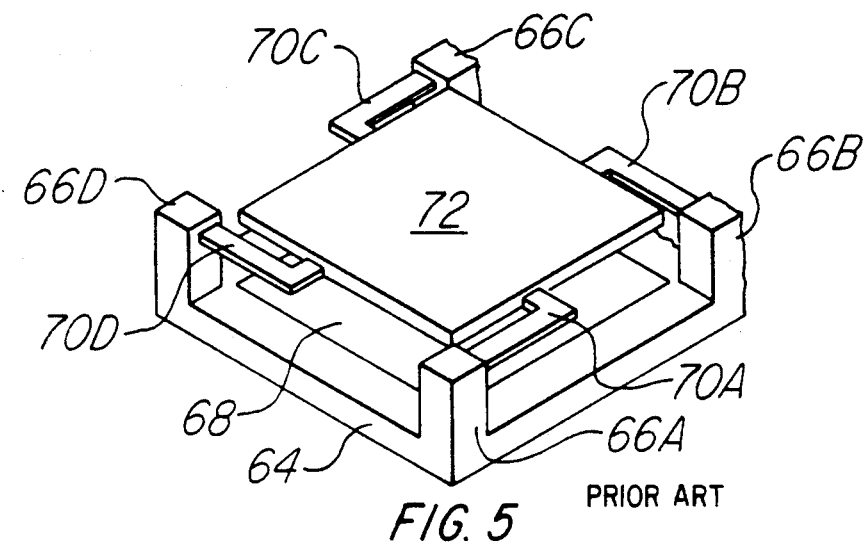
FIG. 5 is a configuration of a flexure beam DMD.

FIG. 5 shows a configuration of a flexure beam DMD. An addressing electrode 68 is built onto a substrate 64. A mirror element 72 is built onto a spacer covering the layer containing the addressing electrode 68. The spacer layer is then etched away. This leaves a layer of support posts 66A, 66B, 66C, and 66D, with a gap between the mirror element 72 and the electrode 68. When a pre-determined voltage is applied to electrode 68, mirror element 72 is electrostatically attracted to it. The flexure hinges 70A, 70B, 70C, and 70D, allow the mirror to deflect downwards. Since all four corners are supported the mirror deflects with a piston-like movement.

The CGH in this system may serve several purposes which include concentrating beams onto the DMD modulator elements, collimating and fanning out the modulated signal beams, and focusing the collimated beams onto detectors. The interconnect scheme may be changed in this optical interconnect system through the use of the DMDs for phase modulation and encoding the CGH such that the collimated beams have the desired phase. The fabrication method used for the CGH is important only in that the desired performance of the CGH is obtained. Fabrication methods for CGH exist that are well known in the art. In this regard, see Farn et al., *Optics & Photonics News*, pp. 20–22, May 1991; Feldman et al., *Optics Letters*, Vol. 14, No. 10, pp. 479–481, May 15, 1989; and Feldman et al., *Applied Optics*, Vol. 26, No. 20, pp. 4377–4384, Oct. 15, 1987, each hereby incorporated by reference.

Figure 6:
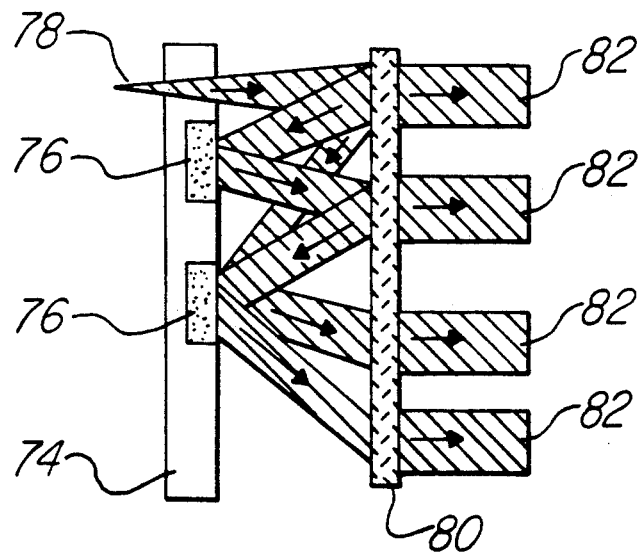
FIG. 6 is an alternate embodiment of the present invention.

An alternate embodiment of the present invention is shown in FIG. 6. In this embodiment the DMD modulators 76 and the optical source 78 are in an input plane 74. Instead of directing beams back to detectors on the same plane as the DMDs and optical sources, as in FIG. 2 and FIG. 3, the CGH 80 transmits the directed beams 82 to a separate output plane (not shown) which contains detectors (not shown).

Since the DMD's are relatively slow compared to processor clock speed, it is envisioned, in this application, that the interconnects will be configured rarely. For example, in applications in which the inter-processor communication message packets are long, a given PE will transmit a long sequence of data before needing to be reconfigured. For applications involving very short message packets the interconnects can be reconfigured at the start of particular tasks. Thus, networks ideally suited for particular applications can be chosen—e.g., a butterfly or perfect shuffle for an FFT, a mesh for a matrix multiplication. In addition, the interconnects can be periodically reconfigured to bypass failed PEs.

An optical interconnection scheme is disclosed utilizing a combination of DMD and CGH. The DMDs are used for interconnection-path selection, using phase-only, frame addressable and microsecond reconfigurable DMDs as light modulators. Reconfigurability is accomplished with an in-phase/out-of-phase interference mechanism. The system offers advantages such as high optical efficiency, reconfiguring effective architecture, high density interconnects and a compact system.

A preferred embodiment has been described in detail hereinabove. It is to be understood that the scope of the invention also comprehends embodiments different from those described, yet within the scope of the claims. For example, the optical source used in the above example is a laser, however, a different source, such as an LED may be used. Similarly, though a CGH is preferred, a hologram fabricated by a different method, which performs essentially the same function may be used. The application presented is for parallel computing, however, this optical interconnect may be used in other systems, for example, a crossbar switch. Words of inclusion are to be interpreted as nonexhaustive in considering the scope of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

TABLE 1

| | | DETECTOR 1 OUTPUT | | | | DETECTOR 2 OUTPUT | | | | DETECTOR 3 OUTPUT | | | | DETECTOR 4 OUTPUT | | | |
|---|---|---|---|---|---|---|---|---|---|---|---|---|---|---|---|---|
| $M_1$ | $M_2$ | a | b | c | d | a | b | c | d | a | b | c | d | a | b | c | d |
| OFF | OFF | 1 | 1 | 1 | 1 | 1 | −1 | −1 | 1 | 1 | 1 | −1 | −1 | 1 | −1 | 1 | −1 |
| ON | OFF | 1 | −1 | −1 | 1 | 1 | 1 | 1 | 1 | 1 | −1 | 1 | −1 | 1 | 1 | −1 | −1 |
| OFF | ON | 1 | 1 | −1 | −1 | 1 | −1 | 1 | −1 | 1 | 1 | 1 | 1 | 1 | −1 | −1 | 1 |
| ON | ON | 1 | −1 | 1 | −1 | 1 | 1 | −1 | −1 | 1 | −1 | −1 | 1 | 1 | 1 | 1 | 1 |

TABLE 2

| $M_1$ | $M_2$ | CONNECTION DETECTOR 1 | CONNECTION DETECTOR 2 | CONNECTION DETECTOR 3 | CONNECTION DETECTOR 4 |
|---|---|---|---|---|---|
| OFF | OFF | YES | NO | NO | NO |
| ON | OFF | NO | YES | NO | NO |
| OFF | ON | NO | NO | YES | NO |
| ON | ON | NO | NO | NO | YES |

TABLE 3

| ELEMENT NO. | DESCRIPTION |
|---|---|
| 10 | COMPUTER GENERATED HOLOGRAM (CGH) PLANE |
| 12 | PROCESSING ELEMENTS PLANE |
| 14 | PROCESSING ELEMENTS |
| 16 | BEAMS FROM PROCESSING ELEMENTS |
| 18 | DIFFRACTED BEAMS FROM CGH |
| 20 | OPTICAL SOURCE (LASER) |
| 22 | CGH SPOT "a" |
| 24 | CGH SPOT "b" |
| 26 | BEAM SENT TO DMD FROM CGH PLANE AND FROM DMD TO CGH SPOT "b" |
| 28 | MODULATOR (DMD) |
| 30 | BEAM FROM SPOT "a" TO FIRST DETECTOR |
| 32 | BEAM FROM SPOT "a" TO SECOND DETECTOR |
| 34 | BEAM FROM SPOT "b" TO FIRST DETECTOR |
| 36 | BEAM FROM SPOT "b" TO SECOND DETECTOR |
| 38 | FIRST DETECTOR |
| 40 | SECOND DETECTOR |
| 42 | OPTICAL SOURCE (LASER) |
| 44 | FIRST MODULATOR (DMD) |
| 46 | SECOND MODULATOR (DMD) |
| 48 | DETECTOR 1 |
| 50 | DETECTOR 2 |
| 52 | DETECTOR 3 |
| 54 | DETECTOR 4 |
| 56 | CGH SPOT "a" |
| 58 | CGH SPOT "b" |
| 60 | CGH SPOT "c" |
| 62 | CGH SPOT "d" |
| 64 | DMD SUBSTRATE |
| 66A | DMD SUPPORT POST A |
| 66B | DMD SUPPORT POST B |
| 66C | DMD SUPPORT POST C |
| 66D | DMD SUPPORT POST D |
| 68 | DMD ADDRESSING ELECTRODE |
| 70A | DMD FLEXURE HINGE A |
| 70B | DMD FLEXURE HINGE B |

TABLE 3-continued

| ELEMENT NO. | DESCRIPTION |
| --- | --- |
| 70C | DMD FLEXURE HINGE C |
| 70D | DMD FLEXURE HINGE |
| 72 | DMD MIRROR ELEMENT |
| 74 | ALTERNATE EMBODIMENT INPUT PLANE |
| 76 | ALTERNATE EMBODIMENT MODULATORS |
| 78 | ALTERNATE EMBODIMENT OPTICAL SOURCE |
| 80 | ALTERNATE EMBODIMENT CGH PLANE |
| 82 | ALTERNATE EMBODIMENT BEAMS FROM CGH |

What is claimed is:

1. An optical interconnect system comprising:
   a. at least two processing elements, each of said processing elements comprising:
      at least one signal transmitter;
      at least one signal receiver; and
      at least one DMD on a support structure shared with said signal transmitter; and
   b. a hologram such that said DMD and said hologram provide the capability to programmably connect said processing elements.

2. The system of claim 1, wherein said signal transmitter is a laser.

3. The system of claim 1, wherein said hologram is a computer generated hologram.

4. The system of claim 1, wherein said system connects one of said signal transmitters to one of said signal receivers.

5. The system of claim 1, wherein said system connects at least two of said signal transmitters to one of said signal receivers.

6. The system of claim 1, wherein said system connects one of said signal transmitters to at least two of said signal receivers.

7. The system of claim 1, wherein said system connects at least two of said signal transmitters to at least two of said signal receivers.

8. The system of claim 1, wherein said system provides a connection network that is reconfigurable by programming said DMD.

9. The system of claim 1, wherein said system is a portion of a parallel computing system.

10. The parallel computing system of claim 9, wherein said parallel computing system comprises an array of processors with integrated photosignal receivers and lasers.

11. The system of claim 1, wherein said signal transmitter and said DMD are on a different support structure than said signal receivers.

12. A method of optically connecting at least one signal transmitter to at least one signal receiver comprising:
   receiving at least two received beams at said signal receiver, said received beams being a portion of an original beam divided at least once by a hologram and at least one of said received beams being reflected at least once by at least one DMD, wherein said DMD is on a support structure shared with said signal transmitter, and said hologram and said DMD provide the capability to programmably connect said signal transmitter and said receiver.

13. The method of claim 12, wherein at least two of said signal transmitters are connected to at least two of said signal receivers.

14. The method of claim 12, wherein at least two of said signal transmitters are connected to one of said signal receivers.

15. The method of claim 12, wherein one of said signal transmitters is connected to at least two of said signal receivers.

16. The method of claim 12, wherein one of said signal transmitters is connected to one of said signal receivers.

17. The method of claim 12, wherein connection of said signal transmitters to said signal receivers is reconfigurable by programming said DMD.

18. The method of claim 12, wherein said signal transmitter is a laser.

19. The method of claim 12, wherein said hologram is a computer generated hologram.

20. The system of claim 12, wherein said signal transmitter and said DMD are on a different support structure than said signal receiver.

* * * * *